United States Patent [19]
Wada

[11] Patent Number: 5,323,224
[45] Date of Patent: Jun. 21, 1994

[54] VARIABLE WAVELENGTH OPTICAL TIME DOMAIN REFLECTOMETRY APPARATUS

[75] Inventor: Fumio Wada, Sakura, Japan

[73] Assignee: Fujikura Ltd., Tokyo, Japan

[21] Appl. No.: 844,291

[22] Filed: Mar. 2, 1992

[30] Foreign Application Priority Data

Mar. 2, 1991 [JP] Japan .................................. 3-061230

[51] Int. Cl.$^5$ .............................................. G01N 21/88
[52] U.S. Cl. ................................. 356/73.1; 250/227.18
[58] Field of Search ........... 356/73.1; 250/226, 227.18

[56] References Cited

U.S. PATENT DOCUMENTS

| | | | |
|---|---|---|---|
| 4,063,106 | 12/1977 | Ashkin et al. | |
| 4,673,299 | 6/1987 | Dakin | 356/73.1 X |
| 4,737,026 | 4/1988 | Dalgoutte et al. | 356/73.1 |
| 4,859,844 | 8/1989 | Herman et al. | 250/226 |
| 5,179,420 | 1/1993 | So et al. | 356/73.1 |
| 5,189,483 | 2/1993 | Inagaki | 356/73.1 |

FOREIGN PATENT DOCUMENTS

| | | |
|---|---|---|
| 0272912 | 6/1988 | European Pat. Off. . |
| 0405553 | 1/1991 | European Pat. Off. . |
| 2852614 | 6/1979 | Fed. Rep. of Germany . |

OTHER PUBLICATIONS

Kawasaki et al "Optical time domain reflectometer for single-mode fiber at selectable wavelengths", Appl. Phys. Lett. 38(10) May 15, 1981, pp. 740-742.
IEEE Journal of Quantum Electronics, vol. QE-18, No. 10, pp. 1509-1515, Oct., 1982, B. Costa, et al., "Phase Shift Technique For The Measurement Of Chromatic Dispersion In Optical Fibers Using Led's".
Frequenz, vol. 35, No. 9, pp. 243-246, 1981, H.F. Schlaak, et al., "Optical Fiber Length Measurement By Pulsereflectometry".

Primary Examiner—Vincent P. McGraw
Attorney, Agent, or Firm—Oblon, Spivak, McClelland, Maier & Neustadt

[57] ABSTRACT

A light pulse having a high intensity generated from LD pumped solid state laser is launched into optical fiber from its one end to generate induced Raman scattering. The induce Raman scattering light emitted from the other end of optical fiber has a wide spectrum of wavelengths with strong intensity. Thus obtained induced Raman scattering light is introduced into optical fiber under test from its one end. Subsequently, the backward scattering light returning to the aforementioned one end is taken out by means of optical coupler or optical switch to brought into optical detectors, which, in turn, detects the light so as to be measured on the intensity of the particular wave components by every period of time by means of digital averaging circuit and computer.

11 Claims, 4 Drawing Sheets

FIG. I

VARIABLE WAVELENGTH OPTICAL TIME DOMAIN REFLECTOMETRY APPARATUS

BACKGROUND OF THE INVENTION

The present invention relates to an optical time-domain reflectometry apparatus capable of measuring characteristics such as optical losses at any point along the longitudinal direction of an optical fiber by launching a light pulse into the optical fiber from its one end and measuring the intensity of the backward scattering light with the passage of time.

In an optical time-domain reflectometry (which will be abbreviated as OTDR hereinafter) apparatus, the loss distribution along the longitudinal direction of an optical fiber can be acquired by the following procedures. A light pulse generated from a light source is launched into an optical fiber under test from one end thereof by means of an optical coupler or optical switch. The light scattered inside the optical fiber under test, returning backward and outgoing from the aforementioned one end (known as backward scattering light), is split from the incident light by means of the optical coupler or optical switch. The backward scattering light, thereafter, is led to an optical receiver to be transformed into electric signals, and thus the intensity of the backward scattering light is obtained in correspondence with the passage of time. The variations in the intensity of the backward scattering light intensity are analyzed with respect to the passage of time from the time at which the light pulse is generated, in order to obtain the loss distribution along the longitudinal direction of the optical fiber.

Since the intensity of the Rayleigh scattering light detected as the backward scattering light is weaker than one-ten thousandth that of the incident light, use of a laser diode (will be abbreviated as LD hereinafter) which is compact and has a high intensity of light has been made. For this light source, the LD devices respectively having wavelengths of 0.85 $\mu$m, 1.3 $\mu$m, and 1.55 $\mu$m are usually employed since these have been brought into commercial use for communication equipment.

The conventional OTDR apparatus, however, has a problem that it is impossible to measure the loss with respect to arbitrary wavelengths in the wide wavelength range, except at 0.85 $\mu$m, 1.3 $\mu$m, and 1.55 $\mu$m. In other words, an LD with a wavelength other than the aforementioned wavelengths is hard to use practically since it is not available due to the lack of production, or due to extremely high cost.

For these reasons, it is impossible to measure the loss increase at a wavelength of 1.38 $\mu$m which may arise when the optical fiber includes impurities such as water or the like. Accordingly, it is impossible to determine whether or not an optical fiber has any locally increased loss by being mixed with impurities in the course of manufacturing, and whether or not an optical fiber has any locally increased loss by water breaking thereinto when the optical fiber installed is submerged. Consequently the conventional apparatuses have difficulty evaluating important factors of optical fibers.

On the other hand, there has been provided another conventional method which makes it possible to measure the loss characteristic of an optical fiber in a wavelength range other than 0.85 $\mu$m, 1.3 $\mu$m, and 1.55 $\mu$m; in such a manner that by leading light having a certain wavelength to one end of the optical fiber with the help of a white light source and spectroscope, the output light from the other end is detected to measure the total loss along the longitudinal direction of the long optical fiber. However with this method, the measurement cannot be made on the loss at each point along the longitudinal direction of the optical fiber, so that it is impossible to measure the loss caused by impurities existing locally along the longitudinal direction.

SUMMARY OF THE INVENTION

It is therefore an object of the present invention to provide an OTDR apparatus at low cost which is readily capable of conducting measurement of an optical fiber on the loss characteristic and the like at any wavelength within a wide range of wavelengths.

The OTDR apparatus of the present invention comprises:

a light source for generating a light pulse;

an optical fiber for receiving the light pulse at its one end and emitting from the other end thereof wavelength-shifted light having wave lengths shifted from the received light pulse under the influence of the non-linear optical effect;

an introducing and extracting means for introducing said wavelength-shifted light into an optical fiber under test and extracting the backward scattering light emitted from the optical fiber under test;

optical detectors for transforming the backward scattering light into electric signals; and a processing means for analyzing the detected signals from the optical detectors with the passage of time, to obtain the loss characteristic of the optical fiber under test.

In the OTDR apparatus of the present invention, a light pulse having a high intensity is projected into the optical fiber from one end thereof for generating induced Raman scattering wavelength-shifted light to be emitted from the other end thereof. The induced Raman scattering light is used as a light source to be incident to the optical fiber under test from one end thereof. In the case where a dispersion-shift fiber is employed as the aforementioned optical fiber, the induced Raman scattering light is to comprise Stokes light waves of first order, second, third, ... and higher orders. On the other hand, in a case where a lengthy single mode fiber is used as the optical fiber, the light is to have a continuous spectrum of wavelengths without any peak. In either case, the scattering light is to arise across the wide range of wavelengths longer than that of the incident light. The induced Raman scattering light thus generated has a considerable intensity and a high enough intensity required for the light source of the OTDR apparatus as some tens hundreds mili-watts. Accordingly, use of the induced Raman scattering light as incident light to the optical fiber under test from one end thereof, makes it possible to measure the loss characteristic and the like at an arbitrary wavelength within a wide range of wavelengths. In addition, measurements on the wide range of wavelengths can be made by this apparatus alone. Moreover the application of the induced Raman scattering light to this apparatus decreases the cost of the apparatus.

DETAILED DESCRIPTION OF THE PREFERRED EMBODIMENTS

Figure 1:
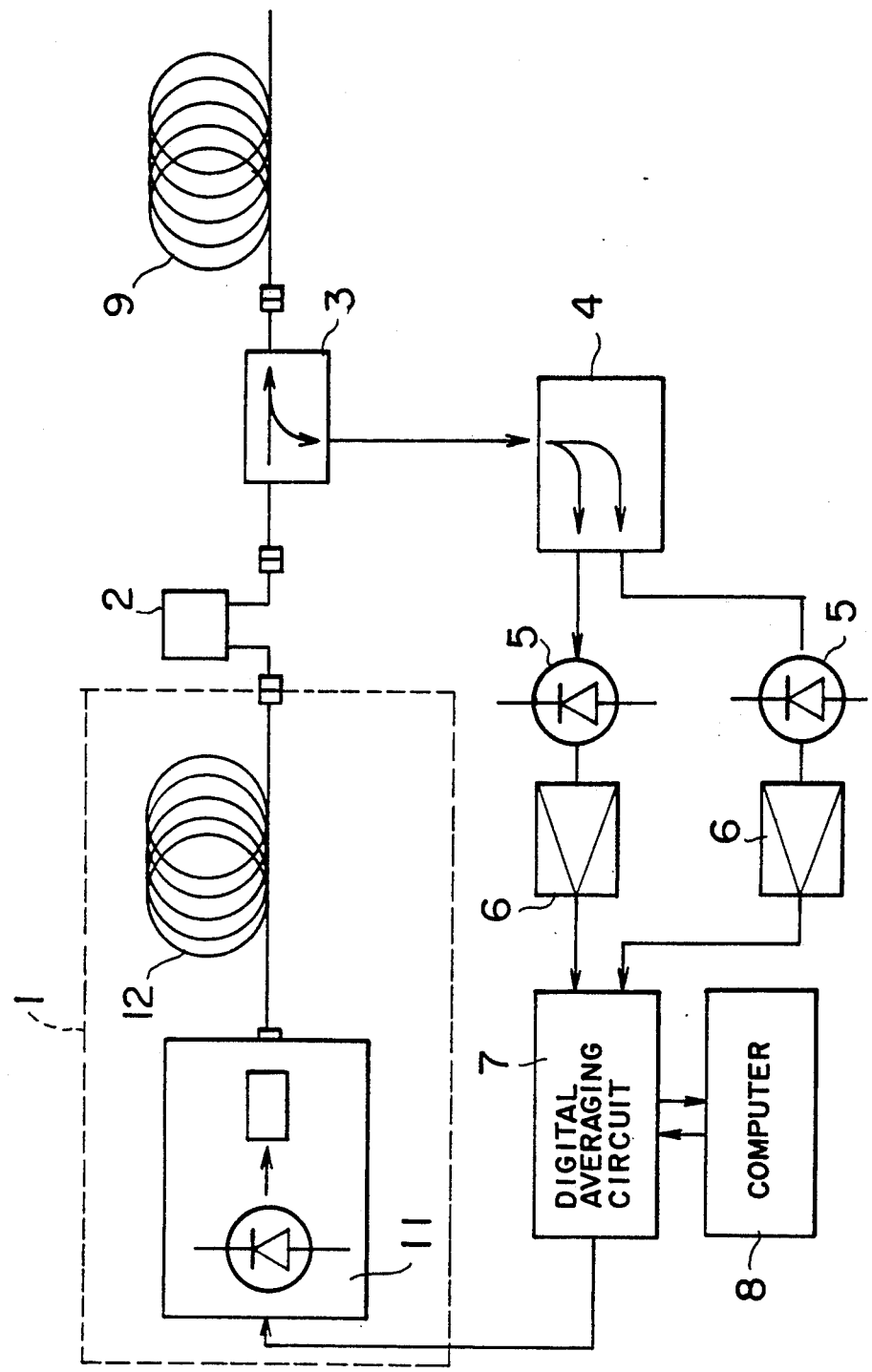
FIG. 1 is a block diagram showing an embodiment of an OTDR apparatus according to the present invention.

As shown in FIG. 1, fiber Raman laser apparatus 1 includes laser diode (LD) pumped solid state laser device 11, and optical fiber 12 connected thereto. A light pulse generated by fiber Raman laser apparatus 1 is incident to optical fiber under test 9 through optical attenuator 2 and optical coupler or optical switch 3. As optical switch 3, for example, a sound effect optical switch and the like can be used. The Rayleigh backward scattering light generated inside this optical fiber under test 9 is split by optical coupler or optical switch 3 to be introduced into spectroscopic device 4. In this embodiment, two kinds of light waves having different wavelengths are taken out from spectroscopic device 4, and respectively transformed into electric signals by optical detectors 5. The transformed electric signals are amplified by amplifiers 6 to be inputted to digital averaging circuit 7, which is connected to, and interactively communicates with, computer 8. Digital averaging circuit 7 transmits a trigger signal for generating a light pulse to LD pumped solid state laser device 11. Synchronizing with a trigger signal, digital averaging circuit 7 starts sampling of the input signals and conducting A/D conversion to collect data as to the intensity of the backward scattering by every unit time from the time at which the light pulse entered optical fiber under test 9. In addition, digital averaging circuit 7 is adapted to take an arithmetical average of the data obtained by repetition of the light-pulse incidences, to thereby improve the S/N ratio. The data obtained are transmitted to computer 8 to be subjected to operation processes. Subsequently, computer 8 displays these data on a display device (not shown in the Figure), plotting, for example, data magnitudes in the y-direction against data sampling times in the x-direction. Such a graph is used to illustrate the loss characteristic at along the longitudinal direction of measured optical fiber 9. When the noise level is low, the treatment of taking an arithmetical average of data becomes unnecessary, and consequently the electric signals obtained by optical detectors 5 can be also observed directly through an oscilloscope.

Next will be an explanation of the operation of the OTDR apparatus configured as described above.

Optical fiber 12 of fiber Raman laser apparatus 1 is adapted to be provided with a pulse light having a higher output than a threshold above which induced Raman scattering occurs. To achieve this, the output of the light pulse should be necessarily more than some watts, but it is difficult for the usual LD to emit a light with such a large output power. It is true that a solid state laser source as well as a gas laser source may emit a high output light pulse, but such apparatuses are bulky and need accessory system such as cooling system and the like, thus resulting in impracticality. To overcome this difficulty, solid state laser device 11 using LD excitation which has recently been brought into commercial use is employed as the light source of this embodiment. This device is one in which a flush lamp as a light source for exciting the conventional solid state laser is replaced with an LD, has a good efficiency and can be miniaturized. As commercially available products of this device, there are known two kinds one of which has for laser oscillation a solid crystal consisting of Nd-doped YAG (yttrium aluminum garnet; $Y_3Al_5O_{12}$) having an oscillating wave length of 1.06 $\mu$m; the other of which has a solid crystal consisting of Nd-doped YLF (yttrium lithium tetra-fluoride; $YLiF_4$) having an oscillating wave length of 1.32 $\mu$m. In this embodiment the latter on is used for LD pumped solid state laser device 11.

When a high output light pulse having a light intensity equal to a threshold or more is incident to optical fiber 12, the induced Raman scattering occurs. Generally, when light is introduced into an optical fiber, there occurs a Rayleigh scattering light wave having the same wavelength with as that of the incident light and the Raman scattering light waves having shifted wavelengths. The intensity of these scattering light waves increase in proportion to that of the incident light (linear effect). However, when the light intensity of the incident light exceeds a certain threshold, there appears non-linear effect, that is, a sharp increase in the light intensity of the Raman scattering light. Subsequently, in the non-linear effect region, the higher order Stokes light waves, which are too faint to be observed in the linear region, become extremely large. Also, in the non-linear effect region the components of the Rayleigh light and anti-Stokes light decrease largely, losing their energies in the Stokes light.

Figure 2:
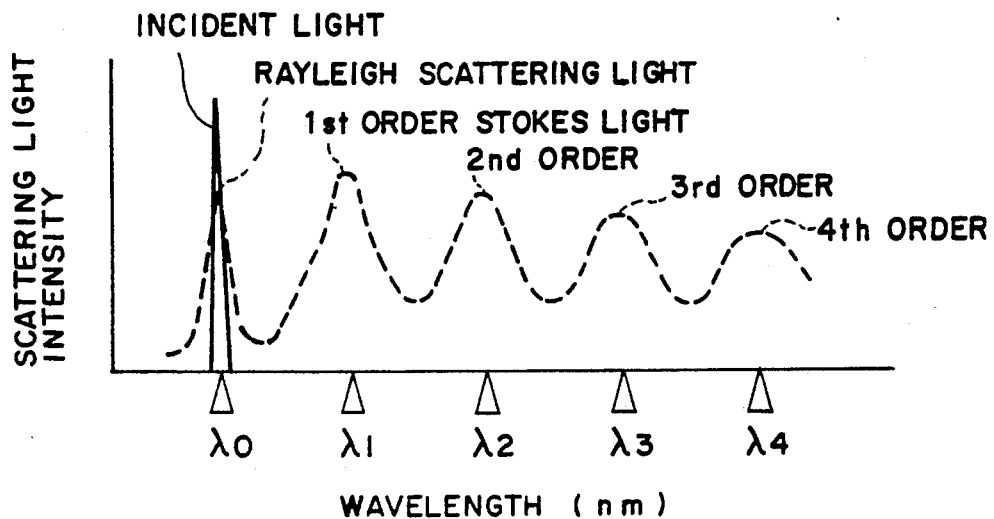
FIG. 2 is a graph plotting spectral characteristics.

Hence, the distribution of the induced Raman scattering light exhibits an aspect as shown by the dashed curve in FIG. 2, having first order, second, third and higher order Stokes light waves generated on the side of longer wavelength than that of the incident light as shown by the solid curve. The incident light has a wavelength of 1.32 $\mu$m as stated above, and the wavelengths of the Stokes light waves of the first order, second order, third order and the fourth order, are respectively 1.403 $\mu$m, 1.495 $\mu$m, 1.600 $\mu$m and 1.721 $\mu$m. As is understood from FIG. 2, this induced Raman scattering light has and therefore can provide in the wide range of wavelengths an intensity required for the OTDR apparatus greater than some hundreds miliwatts. Also as is apparent from the dashed curve in FIG. 2, the intensity of the light is considerably high in wavelengths around the troughs and especially in the wavelengths around the peaks. With regard to an optical fiber, since the incident light is confined within the narrow space inside the core of the optical fiber, the threshold at which the induced Raman scattering becomes dominant is rather low, specifically some tens of watts for multi-mode optical fibers and some watts for single-mode optical fibers. The shifts for Stokes light waves of respective orders are determined depending on constituent molecules of the optical fiber such as Si—O and the like.

The light having a wide range of wavelengths generated in fiber Raman laser apparatus 1 is provided into optical fiber 9 under test via attenuator 2 and optical coupler or optical switch 3. Here, attenuator 2 is used for regulating the intensity of incident light lower than the threshold in order to prevent the induced Raman scattering from arising inside optical fiber under test 9.

Spectroscopic device 4 is composed of, for example a diffraction grating, an optical filter film having dielectric multi-layers or the like. In the case of a diffraction grating being used, advantages as follows can be obtained:

(a) a high insertion loss,
(b) capability of narrowing the range of wavelengths of transmitted light,
(c) freely setting up the range of wavelengths of transmitted light by adjusting positions of the slit and the optical fiber on the light receiving side, and
(d) feasibility of setting up a plurality of wavelengths for transmitted light waves at the same time by arranging a plurality of slits and optical fibers on the light receiving side. On the other hand, when an optical filter film is employed, the insertion loss is low, so that it is impossible to make markedly narrow the range of wavelengths of the transmitting light, but the structure is simple so that the device can be miniaturized.

Figure 3:
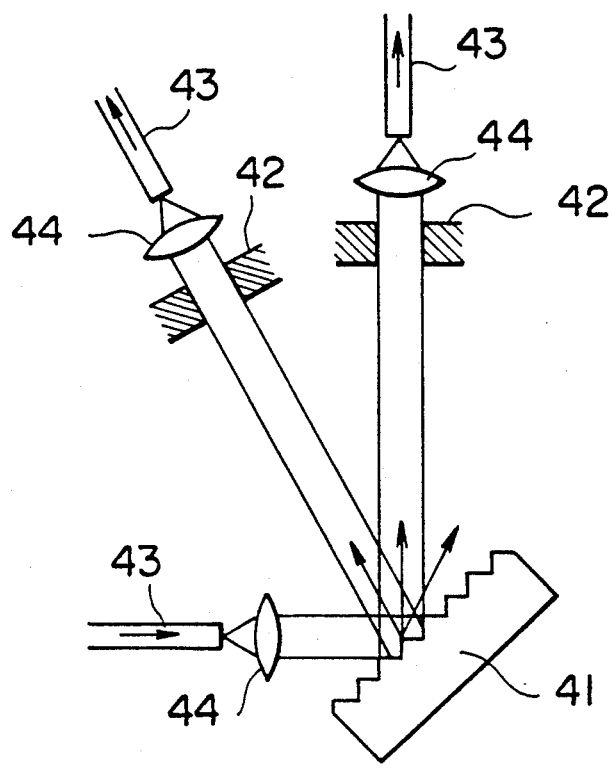
FIG. 3 is a schematic diagram showing a construction example of a spectroscopic device.
Figure 4:
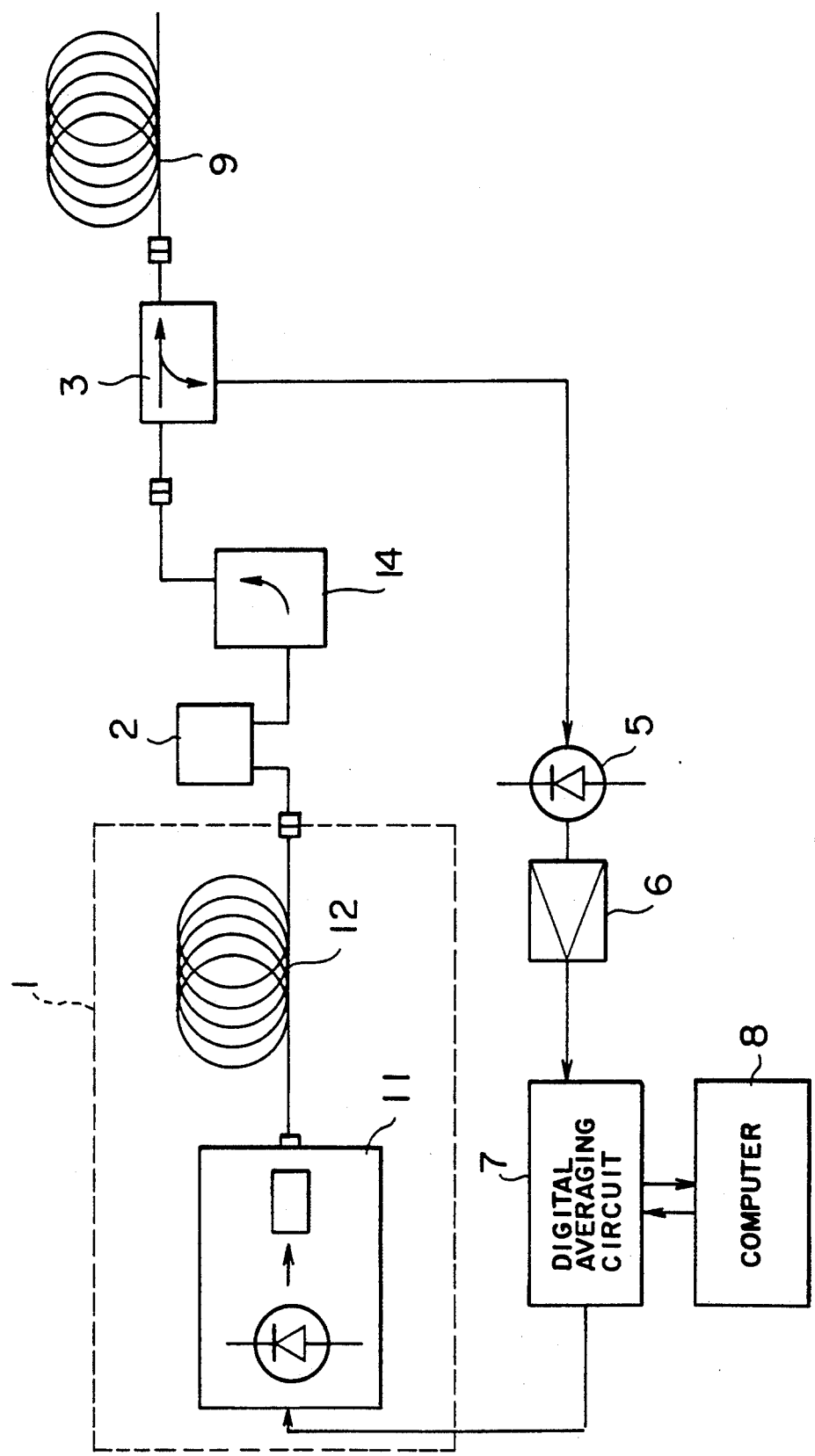
FIG. 4 is a block diagram showing another embodiment of an OTDR apparatus according to the present invention.

In this embodiment, spectroscopic device 4 is structured with diffraction grating 41 as shown in FIG. 3. This diffraction grating 41 receives light having passed through optical fiber 43 and lens 44, and diffracts light to the receiving side. On the receiving side, two slits 42 are disposed to extract light waves from the light coming from diffraction grating 41. The extracted light waves are introduced using respective optical fibers 43 via respective lenses 44. This arrangement makes it possible to pick up and transmit two kinds of light waves having different wavelengths. By setting up, for example, at 1.38 μm one wavelength of the transmitted light, whereas the other at any other wavelength, it is possible to detect the presence of impurity of water component, and at the same time, to measure the loss characteristic, with respect to any point along the longitudinal direction of optical fiber under test 9.

In the embodiment described above, the induced Raman scattering light having a wide rang of wavelengths emitted from optical fiber 12 of fiber Raman laser apparatus 1 is incident to optical fiber 9 under test, which in turn radiates Rayleigh, scattering light having a wide range of wavelengths. The obtained backward scattering light is split by optical coupler or optical switch 3 to be introduced to spectroscopic device 4. Then spectroscopic device 4 takes out particular narrowed ranges of wavelengths of the backward scattering light desired to be measured.

However, it is possible to construct an apparatus in which the light emitted from optical fiber 12 of fiber Raman laser apparatus 1 is attenuated by optical attenuator 2 to be directly subjected to spectroscopic device 14. This spectroscopic device 14 extracts particular narrowed ranges of wavelengths desired to be measured from the induced Raman scattering light emitted from optical fiber 12 having a wide range of wavelengths. The extracted light is introduced to optical fiber under test 9, which, in turn, radiates Rayleigh scattering light having the particular narrowed ranges of wavelengths. The obtained backward scattering light is split by optical coupler or optical witch 3 to be introduced to optical detector 5.

As discussed heretofore, the OTDR apparatus of the present embodiment makes it possible to measure the loss of an optical fiber on the range of wavelengths in which the measurement used to be difficult, with a simple method at low cost. Moreover, it is possible for this apparatus alone to perform the measurement on a wide range of wavelengths.

Next will be described another embodiment of the present invention. In the embodiment described above, a dispersion-shift fiber is employed as optical fiber 12, which produces under the influence of the non-linear optical effect the induced Raman scattering light having peaks of the first order Stokes light wave, the second order Stokes light wave, etc. (refer to FIG. 2). The generated induced Raman scattering light is taken out and introduced into optical fiber under test 9. However, when a single mode fiber is employed as the optical fiber 12, scattering light having a continuous spectrum of wavelength can be obtained due to its non-linear optical effect.

Figure 5:
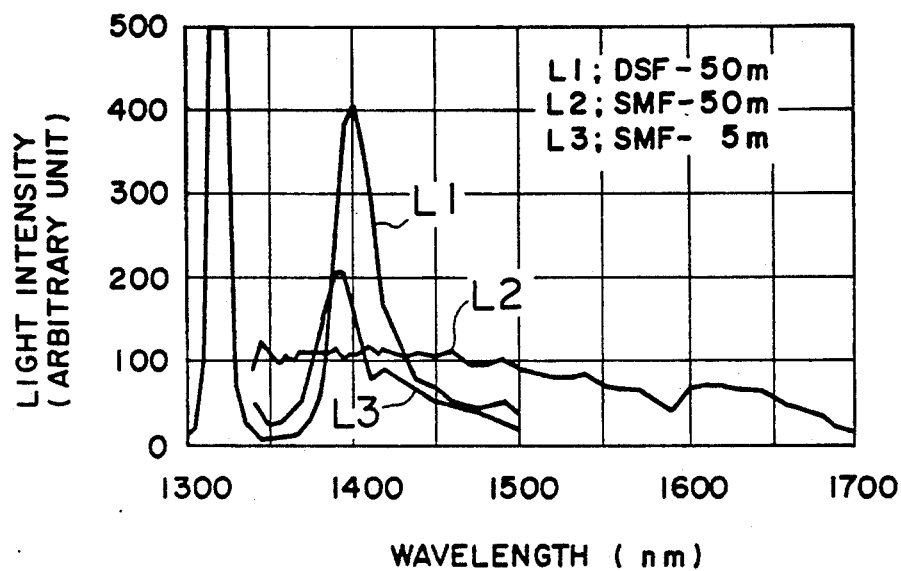
FIG. 5 is a graph showing several kinds of light-emission spectra under the influence of the non-linear optical effect.

FIG. 5 shows several kinds of light-emission spectra under the influence of the non-linear optical effect, taking the wavelength of light emitted from optical fiber 12 as the abscissa, and light intensity (with arbitrary unit) as the ordinate. In the Figure, plot L1 shows the spectrum of the light-emission when a dispersion shift fiber (of 50 m long) is used, plot L2 shows the spectrum when a single mode fiber (of 50 m long) is used, and plot L3 shows the spectrum when a single mode fiber (of 5 m long) is used. Here, the incident light is a light pulse having a wavelength of 1.32 μm and a peak output power of about 100 watts with 30 ns in its pulse width. In the case of the dispersion shift fiber as shown by plot L1, a peak of the first order Stoke light due to the induced Raman scattering is observed. Even though a single mode fiber is used, in the case where the fiber is not longer than 10 m, there exists, as shown by plot L3, a peak to be considered as an induced Raman scattering. On the contrary, in the case where a single mode fiber having a length of 50 m is employed as the case of plot L2, with respect to the emitted light, no peaks are observed, but an even or flat light-emission spectrum is observed ranging from 1.34 to 1.7 μm in wavelength. Here, the emitted light has an intensity of several tens watts or more.

Figure 6:
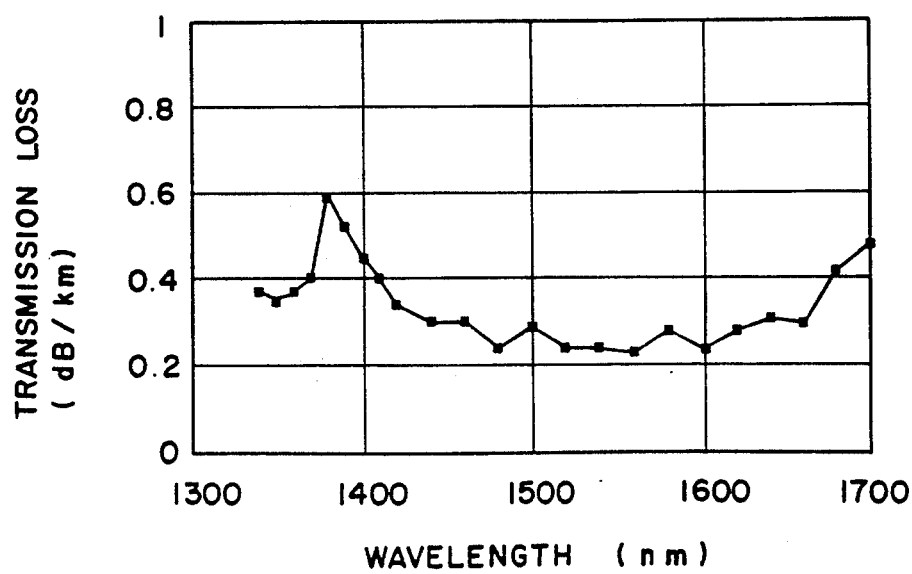
FIG. 6 is a graph showing characteristics of transmission loss caused by an optical fiber under test.

Thus, a lengthy single mode fiber produces light having a continuous spectrum of wavelengths ranging from 1.34 to 1.7 μm, so that use of an optical fiber of this kind makes it possible to construct an OTDR apparatus in which wavelength is variable. For example, light emitted from this non-linear optical fiber 12 and having a continuous spectrum of wavelengths ranging from 1.34 to 1.7 μm, was made to pass through a diffraction grating to obtain light waves each having a wavelength width of 5 nm. The obtained light was introduced into optical fiber under test 9, and the transmission loss was calculated from the backward scattering light. FIG. 6 shows a characteristic of transmission loss caused by an optical fiber under test, taking the wavelength of the incident light into optical fiber under test 9 as the abscissa, and the transmission loss as ordinate. As apparent from FIG. 6, there is an absorption at the wave length of 1.7 μm, and the loss is minimized in the wavelength band of 1.55 μm, whereas the loss increases with the wavelengths of 1.65 μm or more.

What is claimed is:

1. An OTDR apparatus comprising:
   a light source for generating a light pulse;
   an optical fiber having a first end and a second end for receiving said light pulse at the first end and emitting from the other end thereof wavelength-shifted light having wavelengths shifted from said received light pulse under the influence of the nonlinear optical effect;

an introducing and extracting means for introducing said wavelength-shifted light into an optical fiber under test and extracting the backward scattering light emitted from said optical fiber under test;

an optical attenuator, coupled between said optical fiber and said introducing and extracting means, for attenuating the intensity of said wavelength-shifted light introduced into said optical fiber under test, in order to thereby prevent the occurrence of Raman scattering inside said optical fiber under test;

at least one optical detector for transforming said backward scattering light into electric signals; and a processing means for analyzing a detected signal from said at least one optical detector with the passage of time, to obtain a loss characteristic of said optical fiber under test.

2. An OTDR apparatus according to claim 1, wherein said optical fiber is made of a dispersion-shift optical fiber, and said wavelength-shifted light is made of Stokes light waves having peaks.

3. An OTDR apparatus according to claim 1, wherein said optical fiber is made of a single mode optical fiber, and said wavelength-shifted light has a continuous spectrum of wavelengths.

4. An OTDR apparatus according to any one of claims 1 to 3, wherein said light source is a solid state laser device which excites a laser beam by a laser diode.

5. An OTDR apparatus according to any one of claims 1 to 3, wherein said introducing and extracting means includes an optical coupler or optical switch which introduces said wavelength-shifted light into said optical fiber under test, and splits said backward scattering light emitted from said optical fiber under test to be introduced to said at least one optical detector.

6. An OTDR apparatus according to claim 5, wherein said introducing and extracting means includes a first spectroscopic device which separates said backward scattering light into its spectral components and extracts light waves having predetermined wavelengths to be introduced to said at least one optical detector.

7. An OTDR apparatus according to claim 5, wherein said introducing and extracting means includes a spectroscopic device which separates said wavelength-shifted light into its spectral components and extracts light waves having predetermined wavelengths to be introduced to said optical coupler or optical switch.

8. An OTDR apparatus according to claim 1, wherein said processing means determines the loss characteristic of said optical fiber under test by sampling said detected signal from said optical detectors by every unit period of time, and analyzing the obtained data with respect to the passage of time.

9. An OTDR apparatus according to claim 8, wherein said processing means transmits to said light source a trigger signal for generating said light pulse, and starts processing of said backward scattering light with the passage of time by adopting the moment when said trigger signal is generated as an original time point.

10. An OTDR apparatus according to claim 9, wherein said processing means process data by taking an arithmetical average of measurements on backward scattering light corresponding to a plurality of light pulses.

11. An OTDR apparatus comprising:

a light source for generating a light pulse;

an optical fiber having a first end and a second end for receiving said light pulse at the first end and emitting from the second end thereof wavelength-shifted light having wavelengths shifted from said received light pulse under the influence of the nonlinear optical effect;

an introducing and extracting means for introducing said wavelength-shifted light into an optical fiber under test and extracting the backward scattering light emitted from said optical fiber under test;

at least one optical detector for transforming said backward scattering light into electric signals; and a processing means for analyzing a detected signal from said at least one optical detector with the passage of time, to obtain a loss characteristic of said optical fiber under test, wherein said optical fiber is made of a single mode optical fiber, and said wavelength-shifted light has a continuous spectrum of wavelengths.

* * * * *